Sept. 20, 1966    H. A. BOURNE    3,273,641
METHOD AND APPARATUS FOR COMPLETING WELLS
Filed Dec. 16, 1963    2 Sheets-Sheet 2

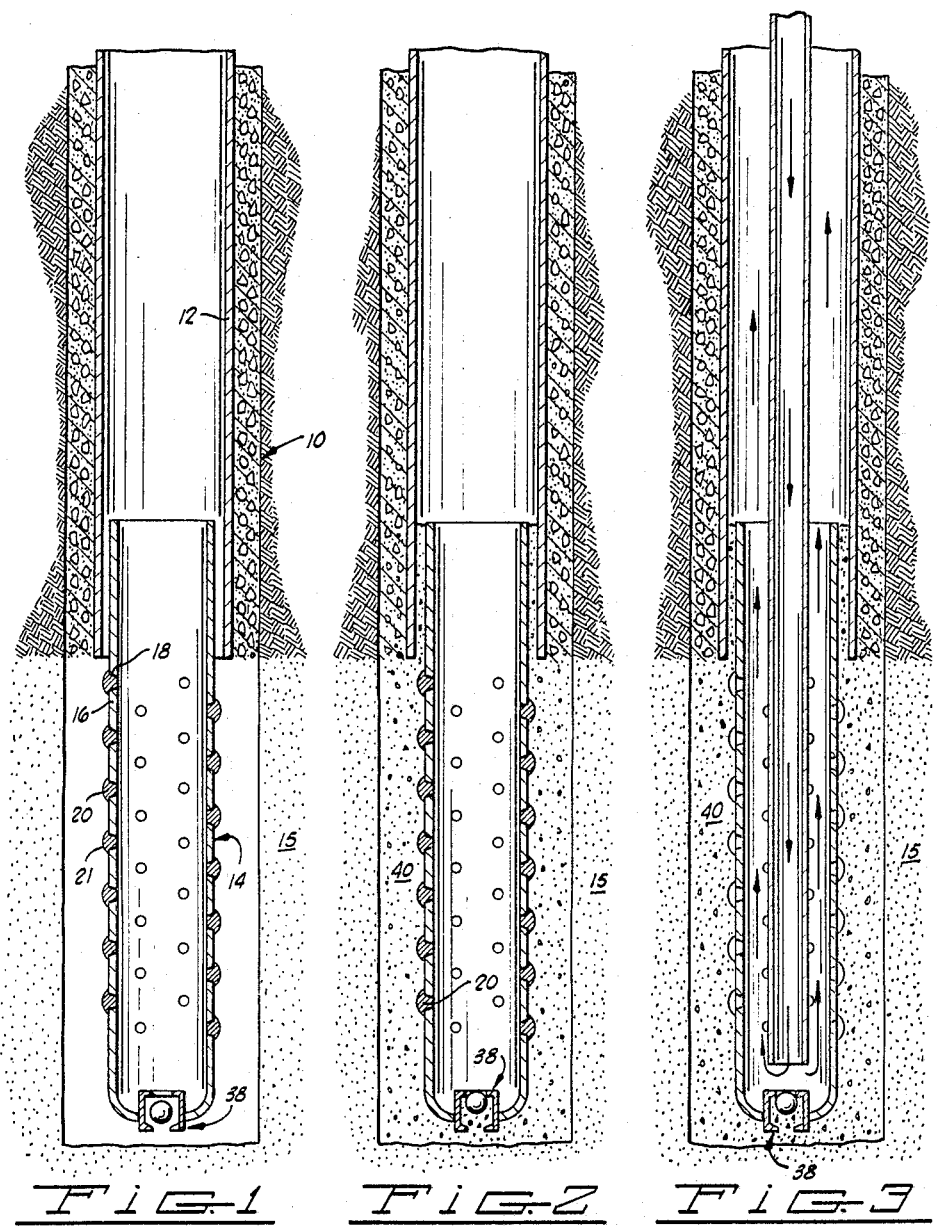

INVENTOR.
HENRY A. BOURNE
BY William J. Miller
ATTORNEY

United States Patent Office 3,273,641
Patented Sept. 20, 1966

3,273,641
METHOD AND APPARATUS FOR COMPLETING WELLS
Henry A. Bourne, Ponca City, Okla., assignor to Continental Oil Company, Ponca City, Okla., a corporation of Oklahoma
Filed Dec. 16, 1963, Ser. No. 330,927
10 Claims. (Cl. 166—12)

This invention relates generally to improvements in apparatus and methods useful in completing oil and gas wells or the like. More particularly, the present invention relates to improvements in well screens and methods involved in the utilization of such screens in oil and gas wells or the like.

Well screens are generally sections of well casing or tubing containing numerous holes extending transversely through the wall thereof. Such holes are usually small in relation to the size of the screen. Well screens are use advantageously where the production strata has a tendency to slough, or in any application where the well has the undesirable characteristic of producing sand or other foreign materials along with the oil or gas. A sloughing formation may eventually plug the well and require extensive and extremely expensive clean-out operations. Sand being produced may plug the well, but generally this type of granular material tends to cause malfunctions in well pumps and other equipment used to produce the well.

Oftentimes in the past, well screens were positioned in the well and gravel or other similar filter media was pumped through the lower end of the screen and displaced to a position between the exterior of the screen and the wall of the well. The foregoing procedure has been termed "gravel packing" or "sand consolidation" and serves to filter sand and other substances from the oil prior to reaching the screen.

Generally, the positioning of the screen in the well is performed by screen or liner setting tools which are well known in the art. Permanent positioning is usually obtained by cementing the screen in the well. However, the cement in such an operation has generally been placed above the screen or at the unperforated upper end of the screen rather than around the main body portion of the screen and serves to isolate the screen from formations thereabove as well as retaining the screen in a permanent position. In addition to the screen, it is still desirable to place a filter media externally of the screen. Thus several operations involving several different types of equipment and procedures are required to complete the well. In many of these procedures it has been recognized as desirable to temporarily close the openings or perforations through the screen. This has been accomplished with various types of plugs, and the removal of these plugs after their usefulness has ended has presented difficulties and has resulted in several disadvantages. For example, where the screen has been cemented in place in the manner above described, removal of the plugs through the use of acids in which the plug material is soluble may result in the acid attacking the cement and weakening the sealing bond between the cement and the screen or other casing sections. The same disadvantage has been attributed to removing the plugs by percussion or impact.

One object of this invention is the provision of apparatus and equipment that permits the permanent positioning of a well screen and placement of the filter media therearound by a simple and easily practiced cementing method.

Another object of the invention is to provide an improved well screen that has the transverse openings therein temporarily closed whereby fluid can be circulated therethrough when said openings are cleared.

A further object of the invention is to provide an improved well screen that has the transverse openings therein temporarily closed by a material having a melting point above the temperature generated by the hydration of cement and the temperature of the reservoir, but sufficiently low to be melted by a heated fluid circulated in the well.

A still further object of the invention is to provide an improved well screen having transverse openings, and having temporary plugs therein arranged to permit a differential pressure to be applied thereacross without displacement of the plugs from the transverse openings.

Still another object of the invention is to provide an improved method of completing an oil and gas well or the like that includes positioning a well screen in the well by means of a permeable, exothermically curing cement placed exteriorly of the screen.

Yet another object of the present invention is to provide an improved well screen which is especially well adapted to use in conjunction with a permeable cement positioned around the screen, and which in use can be keyed to the cement to prevent axial movement of the cement relative to the wall of the screen.

In accordance with one aspect of the invention, there is provided an improved well screen including a tubular body having a plurality of transversely extending holes formed in the body, and fusible means for temporarily closing the holes, said fusible means having a melting point above the temperature of hydrating cement and of the reservoir, but low enough to be melted by a heated fluid circulated in the well.

In accordance with another aspect of the invention, there is provided an improved method for completing an oil and/or gas well or the like, which method includes the steps of placing a well screen, having fusible means temporarily closing transverse openings therein, in the well; placing a permeable filter media exteriorly of the screen in the well; and removing by fusion the means temporarily closing the openings in the screen.

Additional objects and advantages of the invention will become apparent as the following description is read in conjunction with the accompanying drawings wherein like reference characters denote like parts in all views and wherein:

FIGURE 1 is a cross-sectional view of a well screen positioned in a cased well bore, in which screen the transverse openings are temporarily closed.

FIGURE 2 is a cross-sectional view similar to FIGURE 1, but showing the screen surrounded by a filter media.

FIGURE 3 is a cross-sectional view similar to FIGURES 1 and 2, but showing the plugs removed from the transverse openings, and showing a tubing used to deliver a heated fluid into the screen.

Figure 4:
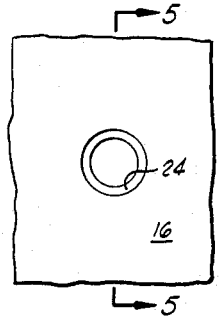
FIGURE 4 is an enlarged elevation view of a portion of the well screen illustrating a tapered transverse hole in the wall thereof.

Referring to the drawings, and to FIGURE 1 in particular, a well bore is generally designated by the reference numeral 10. A casing 12 is illustrated as being positioned in the well bore 10 and is cemented in the well bore above the bottom thereof. A well screen 14 is shown, partially within the casing 12 and partially within the open lower end of the well bore 10, adjacent a producing formation 15.

The well screen 14 includes a tubular body 16 having a plurality of openings 18 formed therein (see FIG. 3). The openings 18 may be of various shapes and arrangements depending on the particular application of the screen in the well but in one embodiment of the invention are tapered inwardly to enable the practice of the process of the invention as hereinafter described. Plugs 20 are utilized to close the openings 18 while the screen 14 is being placed in the well bore 10, and during certain operations performed therein as will be explained more fully hereinafter.

Figure 5:
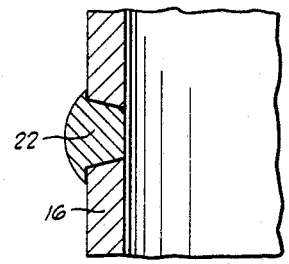
FIGURE 5 is a cross-sectional view taken along the line 5—5 of FIGURE 4, but also showing a plug in said transverse hole.
Figure 6:
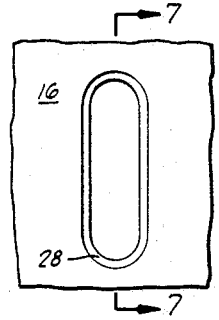
FIGURE 6 is an enlarged elevation view of a portion of the well screen illustrating a tapered transverse slot in the wall thereof.
Figure 7:
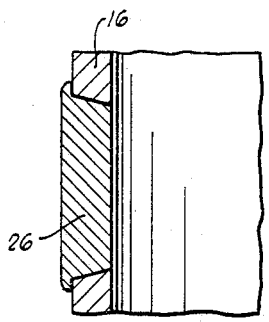
FIGURE 7 is a cross-sectional view taken along the line 7—7 of FIGURE 6, but also showing a plug in said transverse slot.
Figure 9:
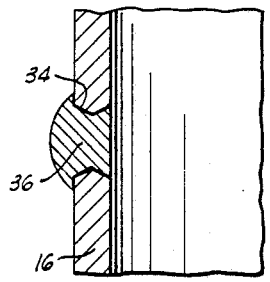
FIGURE 9 is an enlarged cross-sectional view of a portion of a well screen showing a double tapered transverse opening in the wall of the well screen and a plug therein.
Figure 8:
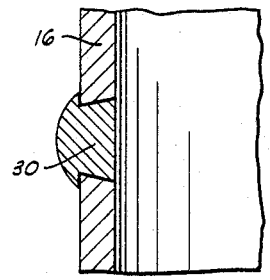
FIGURE 8 is an enlarged cross-sectional view of a portion of a well screen having a tapered hole with a plug therein, but having the taper in a reverse direction to that of FIGURE 4.

The plugs 20 will be of the same general configuration as the openings 18 that they fill. Additionally, the plugs 20 are preferably, though not necessarily, provided with rounded or convex heads 21 which protrude radially from the wall of the screen. Examples of such plugs are shown in FIGURES 5, 7, 8, and 9. Plug 22 shown in FIGURE 5 is used to fill a tapered hole 24 of FIGURE 4 when the pressure differential across the wall of the screen 14 results from a higher pressure existing on the exterior of the screen 14. Likewise, plug 26 shown in FIGURE 7 and filling a slot 28 shown in FIGURE 6, is used for withstanding a differential pressure in the same direction. A plug 30 illustrated in FIGURE 8 is used to fill a hole 32 having an opposite taper to that of the plug 22. Such a reverse taper is useful when the anticipated differential pressure acts from the inside to the outside of the screen 14. The slot 28 of FIGURE 6 may also be tapered in the opposite direction from that illustrated. Should a situation occur wherein a differential may exist first in one direction and then the other, an opening 34 and its corresponding plug 36 of the shape illustrated in FIGURE 9 can be used. It should be apparent from the foregoing that the plug and opening used will be so constructed that pressure will tend to seat the plug more firmly in the tapered opening.

Plugs of the various forms illustrated are preferably made from a fusible metal or metallic alloy that has a melting point which is above the normal reservoir temperature or hydration temperature of cement, but which is low enough that a heated fluid, such as steam, hot water or hot oil can be used to melt the plugs. Fusible alloys of this type are generally composed of eutectic mixtures of bismuth, tin, lead, cadmium, indium and antimony in various combinations and percentages. One example of such an alloy is Wood's metal which has a melting point of 158° F. Other examples of usable alloys are Lipowitz alloy having a melting point of 158° F. and Rose metal having a melting point of 196° F. In general, metals or alloys having a melting point below about 500° F. can be used.

The screen 14 may also be provided with a check valve assembly 38 which is constructed to permit flow from the interior of the screen 14 to the exterior thereof while preventing flow in the opposite direction. Such valves are well known in the art and no further description is believed necessary. It should be pointed out, however, that the opening through the check valve 38 should be sufficiently large to permit relatively large gravel to pass therethrough when the screen 14 is used in conjunction with a "gravel-packing" operation.

A preferable method of utilizing the well screen 14 is in conjunction with a permeable filter media 40. It may thus be used in conjunction with "gravel-packing," with sand consolidation, or with permeable cement serving as the filter media as shown in the drawings.

When used with permeable cement, the procedure employed is to initially position the preperforated and plugged screen 14 in the well bore 10. As previously stated, the screen 14 is usually located adjacent a producing zone or formation in the well and is positioned therein using conventional tools. Once the screen 14 is positioned a permeable cement is pumped through conventional cementing apparatus, through the casing 12, the plugged screen 14 and the check valve 38 into the well bore 10. The cement is then displaced upwardly until it fills the cavity between the exterior of the screen 14 and the interior wall of the well. Ordinarily, the cement is overly displaced to be certain that none remains in the screen 14. The check valve 38 permits the complete displacement of the cement from within the screen 14 and prevents it from returning into the screen upon release of the pressure displacing the cement. After sufficient time has elapsed to permit the cement to set, a tubing 42 which may be a part of the cementing apparatus is utilized to circulate stem, hot water, or hot oil through the interior of the screen 14. Due to the high temperature of the circulating fluid, the plugs 20 are melted from the openings 18.

Figure 10:
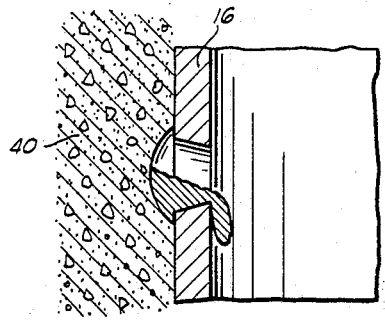
FIGURES 10 and 11 are enlarged cross-sectional views illustrating two stages in the removal of the fusible screen plugs using a heated fluid.
Figure 11:
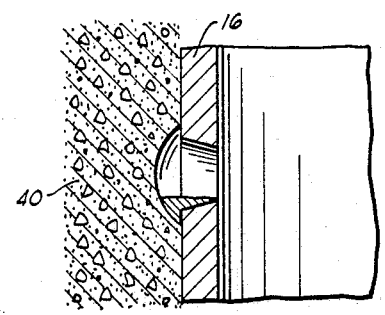

In FIGURES 10 and 11, the configuration assumed by the headed plugs as a result of fusion is illustrated. It will be noted that continued contact of the plugs with the heated fluid causes the plugs to melt and gravitate downwardly in the screen. However, a small pocket of the molten plug metal accumulates in the recess formed in the cement by the head 21 of the plug 20. This residual metal forms a key between the screen 14 and the surrounding cement and aids in preventing axial shifting of the cement relative to the screen. Of course, the head 21 of the plug 20 serves the same purpose while the cement is setting up and prior to melting of the plugs.

With the plugs 20 removed, well fluids can pass from the formation, through the permeable cement filter media, and into the interior of the screen 14. The minute flow passageways through the permeable cement 40 perform a thorough filtering action to remove foreign materials from the well fluids. It should also be pointed out that the setting of the permeable cement 40 in the well bore 10 effectively prevents any sloughing of the formation that might otherwise occur. Also, the foregoing provides all the benefits obtained by cementing, but eliminates the necessity of perforating the casing or tubing with projectiles or pets to obtain production from the formation. The possibility of damaging the producing formation or the cement by the use of acids which have been used to remove plugs in the past has also been eliminated.

When using the screen 14 in "gravel-packing," a similar procedure can be followed, except that an additional step of cementing the screen 14 in either the casing 12 or the well bore 10 is desirable.

When using the screen 14 in sand-consolidation, a slightly varied procedure may be used to great advantage. The sand utilized in such a procedure is generally small enough to pass through the openings 18. If the openings 18 were not plugged, it would be difficult to displace the sand to a position outside the screen 14 without leaving considerable sand within the screen 14. However, with the plugged screen 14, the sand can be moved just as is the permeable cement so that it occupies the cavity between the exterior of the screen 14 and the wall of the well bore 10. After the sand is in place, the consolidating materials can be pumped through the check valve 38 into the sand. When the consolidating materials are set, the plugs 20 can be removed as previously described. It is believed that a better dispersion of the consolidating materials can be obtained by removing the plugs 18 after the sand is in place and then pumping the consolidating materials through the plurality of openings 18. With either procedure, a permeable consolidated-sand filter media can be obtained.

It may be necessary in the sand-consolidation procedure to cement the screen 14 in place in the casing 12 or the well bore 10. This will depend upon the anticipated strength of the consolidation materials.

All of the heretofore described operations can be accomplished using conventional cementing apparatus and can be easily performed by those having ordinary skill in the art of well cementing. It is believed that the well screen described herein, and the methods of completing wells utilizing such screen, particularly in conjunction with the use of permeable cement, are novel and provide an advance in the art of well completion.

The foregoing is by way of example only and it should be realized that many changes and modifications can be made in the apparatus and procedural steps hereinbefore described without departing from the spirit of the invention or from the scope of the annexed claims.

What I claim is:

1. A method of completing an oil and gas well or the like including the steps of:
    positioning in the well, a well screen having fusible means temporarily closing a plurality of transverse openings therein;
    placing a permeable cement in said well around the exterior of said screen; and
    melting the fusible means temporarily closing said openings.

2. A method of completing oil and gas wells or the like including the steps of:
    positioning in the well, a well screen having fusible means temporarily closing a plurality of transverse openings therein;
    placing unconsolidated sand in said well around the exterior of said screen;
    melting the fusible means temporarily closing said openings; and,
    contacting said unconsolidated sand with consolidating materials.

3. A method of completing oil and gas wells or the like including the steps of:
    positioning in the well, a well screen having fusible means temporarily closing a plurality of transverse openings therein;
    placing unconsolidated sand in said well around the exterior of said screen;
    contacting said unconsolidated sand with consolidating materials; and,
    melting the fusible means temporarily closing said openings.

4. A well screen for use in an oil and gas well or the like including:
    a tubular body having an upper end and a lower end and having a plurality of tapered openings extending transversely through the wall;
    check valve means in said lower end adapted to permit flow from the interior of said body to the exterior thereof, and to prevent flow in the opposite direction; and,
    tapered plug means closing said openings and having a shank portion tapered to seat within said openings and a head portion fixed to said shank and extending outwardly from the surface of said tubular body, said plug means consisting of a fusible alloy having a melting point above the temperature in the well and above the hydration temperature of cement, and low enough to be melted by a heated fluid.

5. A well screen as claimed in claim 4 wherein the taper of said openings and said plug means is a converging taper toward the interior of said tubular body from the exterior thereof.

6. A well screen as claimed in claim 4 wherein the taper of said openings and said plug means is a diverging taper toward the interior of said tubular body from the exterior thereof.

7. A well screen for use in oil and gas wells or the like including:
    a tubular body having an upper and a lower end;
    check valve means in said lower end adapted to permit flow from the interior of said body to the exterior thereof, and to prevent flow in the opposite direction;
    means forming a plurality of openings extending transversely through the wall of said body, said openings having a double tapered surface convergent from the exterior and the interior of the body; and,
    plug means closing said openings and having a surface thereon adapted to cooperate with the double tapered surface of the openings, said plug means consisting of a fusible alloy having a melting point above the temperature in the well and above the hydration temperature of cement and low enough to be melted by a heated fluid.

8. A well screen as claimed in claim 7 wherein said fusible alloy has a melting point between 150° F. and 500° F.

9. A well screen as claimed in claim 8 wherein said fusible alloy is Rose metal.

10. A well assembly for producing hydrocarbons from a subterranean formation comprising:
    a tubular body positioned in said subterranean formation;
    means forming a plurality of openings extending transversely through the wall of said tubular body;
    a fusible metal in said openings obstructing fluid flow therethrough, said metal having a melting point higher than the temperature prevailing in said subterranean formation and lower than about 500° F.; and,
    a permeable cement interposed between said tubular body and said subterranean formation in contact with said body and said fusible metal.

References Cited by the Examiner

UNITED STATES PATENTS

| | | | |
|---|---|---|---|
| 1,912,578 | 6/1933 | Halliburton | 166—28 |
| 2,190,989 | 2/1940 | Johnston | 166—12 X |
| 2,335,578 | 11/1943 | Carter | 166—205 |
| 3,057,405 | 10/1962 | Mallinger | 166—25 |
| 3,099,318 | 7/1963 | Miller et al. | 166—227 |
| 3,137,346 | 6/1964 | McLennan | 166—12 X |
| 3,163,218 | 12/1964 | Allen et al. | 166—25 |

CHARLES E. O'CONNELL, *Primary Examiner.*

D. H. BROWN, *Assistant Examiner.*